US008383289B2

(12) United States Patent
Craft, Jr. et al.

(10) Patent No.: US 8,383,289 B2
(45) Date of Patent: Feb. 26, 2013

(54) ELECTRONICS CABINET WITH AIR FEED SYSTEM FOR BACKUP POWER FUEL CELL

(75) Inventors: Thomas F. Craft, Jr., Murphy, TX (US); Anil K. Trehan, Plano, TX (US)

(73) Assignee: CommScope, Inc. of North Carolina, Hickory, NC (US)

( * ) Notice: Subject to any disclaimer, the term of this patent is extended or adjusted under 35 U.S.C. 154(b) by 613 days.

(21) Appl. No.: 12/416,096

(22) Filed: Mar. 31, 2009

(65) Prior Publication Data

US 2009/0246582 A1 Oct. 1, 2009

Related U.S. Application Data

(60) Provisional application No. 61/041,575, filed on Apr. 1, 2008, provisional application No. 61/047,016, filed on Apr. 22, 2008, provisional application No. 61/047,031, filed on Apr. 22, 2008.

(51) Int. Cl.
*H01M 8/04* (2006.01)

(52) U.S. Cl. ........................................................ 429/512

(58) Field of Classification Search .................. 429/512, 429/514, 535, 518
See application file for complete search history.

(56) References Cited

U.S. PATENT DOCUMENTS 3,523,830 A 8/1970 Baker et al.
4,782,669 A 11/1988 Trocciola et al.
5,200,278 A 4/1993 Watkins et al.
5,314,762 A 5/1994 Hamada et al.
5,316,869 A 5/1994 Perry et al.
5,616,431 A 4/1997 Kusunoki et al.
6,087,028 A 7/2000 Goto
6,232,006 B1 5/2001 Breault
6,673,482 B2 1/2004 Imazeki et al.
6,755,037 B2 * 6/2004 Engel et al. .................... 62/177
6,885,112 B2 4/2005 Johnson
6,916,566 B2 * 7/2005 Saloka et al. ................ 429/429
7,005,206 B2 2/2006 Lawrence et al.
7,100,385 B2 9/2006 Craft, Jr. et al.
7,205,062 B2 4/2007 Tawfik et al.
7,264,895 B2 9/2007 White
7,316,855 B2 1/2008 Lawrence et al.
7,602,073 B2 10/2009 Meyers et al.
2001/0049039 A1 12/2001 Haltiner, Jr.
2002/0037447 A1 3/2002 Imaseki et al.
2002/0119354 A1 8/2002 O'Brien et al.
2003/0031904 A1 2/2003 Haltiner, Jr.
2003/0039872 A1 2/2003 Grasso et al.
2003/0039873 A1 2/2003 Condit et al.
2003/0087139 A1 * 5/2003 White ............................ 429/24
2003/0170528 A1 9/2003 Simpson et al.
2004/0053104 A1 3/2004 Novkov et al.
2004/0146761 A1 * 7/2004 Cargnelli et al. ............... 429/22
2004/0161657 A1 * 8/2004 Simpson et al. ................ 429/38
2005/0074644 A1 4/2005 Ueda et al.
2005/0091922 A1 * 5/2005 Goebel et al. ............... 48/198.7
2005/0129990 A1 6/2005 Ozeki et al.
2005/0262818 A1 * 12/2005 Stenersen ...................... 55/482
2006/0078777 A1 4/2006 Grimes et al.
2006/0105209 A1 5/2006 Thyroff et al.
2006/0151156 A1 * 7/2006 Valensa et al. ............... 165/167

(Continued)

FOREIGN PATENT DOCUMENTS

EP 1 187 242 3/2002
WO WO 2008/016257 2/2008

*Primary Examiner* — Jean F Duverne
(74) *Attorney, Agent, or Firm* — Muncy, Geissler, Olds & Lowe, PLLC

(57) ABSTRACT

An air feed system for a fuel cell cabinet is provided. The air feed system supplies temperature controlled air to a fuel cell. The air feed system includes a controller that controls the air feed system for maintaining a predetermined temperature range of the temperature controlled air entering the fuel cell.

30 Claims, 19 Drawing Sheets

Ambient Air In from Exterior $T_a$
Air Filter 502
$T_a$
Heater 504
Controller 512
$T_{intake}$
Fuel Cell 506
$T_{exit}$
Plenum 508
Exhaust Fan 510
Exhaust to Exterior

500

U.S. PATENT DOCUMENTS

2006/0166056 A1 7/2006 Nakamura et al.
2006/0199064 A1* 9/2006 Arnold et al. ................... 429/34
2006/0204412 A1* 9/2006 Rizzo et al. ................... 422/198
2006/0246328 A1 11/2006 Willets et al.
2007/0059583 A1 3/2007 Vinsant
2007/0275281 A1 11/2007 White
2008/0038610 A1 2/2008 Darling
2008/0138671 A1* 6/2008 Kolodziej et al. ............... 429/13
2008/0213638 A1* 9/2008 Brantley et al. ................. 429/19
2008/0268300 A1 10/2008 Pfefferle
2009/0035616 A1 2/2009 Darling et al.
2009/0123797 A1* 5/2009 Kaye et al. ...................... 429/17
2010/0221642 A1 9/2010 Frahm et al.
2011/0039177 A1* 2/2011 Yamaga et al. ............... 429/431
2012/0028155 A1* 2/2012 Desrosiers et al. ........... 429/436
2012/0074902 A1* 3/2012 Scheucher .................... 320/109
2012/0080941 A1* 4/2012 Scheucher ...................... 307/18

* cited by examiner

300

900

930

ELECTRONICS CABINET WITH AIR FEED SYSTEM FOR BACKUP POWER FUEL CELL

CLAIM OF PRIORITY UNDER 35 U.S.C. §119

The present invention claims the benefit of Provisional Application No. 61/041,575 entitled "Liquid Cooling System for Fuel Cell Cabinets, Air Feed System for Fuel Cell Cabinets, Heat Management and Thermal Control of Cabinets for Fuel Cells, and EcoPower Cabinet" filed Apr. 1, 2008, Provisional Application No. 61/047,016 entitled "Cabinet Air Feed and Exhaust System for Hydrogen Fuel Cell Declassification" filed Apr. 22, 2008, and Provisional Application No. 61/047,031 entitled "Fuel Cell Cabinet Waste Water Management System" filed Apr. 22, 2008, the entire contents of which are hereby incorporated by reference.

REFERENCE TO CO-PENDING APPLICATIONS FOR PATENT

The present Application for Patent is related to the following co-pending U.S. Patent Applications:

"ELECTRONICS CABINET WITH LIQUID COOLING SYSTEM FOR BACKUP POWER FUEL CELL" (U.S. application Ser. No. 12/416,087), filed Mar. 31, 2009, assigned to the assignee hereof, and the entire contents of which are hereby incorporated by reference;

"ELECTRONICS CABINET WITH HEAT MANAGEMENT AND THERMAL CONTROL SYSTEM FOR BACKUP POWER FUEL CELL" (U.S. application Ser. No. 12/416,106), filed Mar. 31, 2009, assigned to the assignee hereof, and the entire contents of which are hereby incorporated by reference;

"ELECTRONICS CABINET WITH AIR FEED AND EXHAUST SYSTEM FOR BACKUP POWER FUEL CELL" (U.S. application Ser. No. 12/416,113), filed Mar. 31, 2009, assigned to the assignee hereof, and the entire contents of which are hereby incorporated by reference; and "ELECTRONICS CABINET WITH WASTE WATER MANAGEMENT SYSTEM FOR BACKUP POWER FUEL CELL" (U.S. application Ser. No. 12/416,116), filed Mar. 31, 2009, assigned to the assignee hereof, and expressly incorporated by reference herein.

FIELD OF THE INVENTION

The present invention relates to cabinets for housing electronic equipment. More particularly, the present invention relates to a cabinet for housing electronic equipment and a connection panel for cross-connecting the electronic equipment with various provider and/or subscriber lines, wherein the cabinet includes a fuel cell power backup system, and more particularly, to a fuel cell cabinet having an air feed system for the fuel cell power backup system.

BACKGROUND OF THE INVENTION

Outdoor cabinets that house electronic equipment and connection panels are generally known in the art. The connection panel (sometimes referred to as a feeder-distribution interface), within the cabinet, is used to connect subscriber lines to provider lines directly, or in parallel or serial, with terminals of certain electronic equipment also within the cabinet, such as surge protectors, switches, servers, etc.

In some conventional cabinets, the electronic equipment includes a fuel cell power backup system. The electronic equipment may be sensitive to temperature and humidity and the air and the electronic equipment in the interior of the cabinet may be environmentally controlled by employing a heat exchanger, dehumidifier, and/or air conditioner.

SUMMARY OF THE INVENTION

These problems and others are addressed by the present invention, a first aspect of which comprises a fuel cell cabinet comprising an air feed system that supplies temperature controlled air to a fuel cell, and a controller that controls the air feed system for maintaining a predetermined temperature range of the temperature controlled air entering the fuel cell.

Another aspect is directed to a fuel cell cabinet air feed system comprising a fuel cell, an air feed system that supplies temperature controlled air to the fuel cell, and a controller that controls the air feed system for maintaining a predetermined temperature range of the temperature controlled air entering the fuel cell.

Another aspect is directed to an air feed system for a fuel cell cabinet comprising a heater, a heat sink on the heater, and a housing surrounding the heater and the heat sink, wherein the housing manages a flow of air over the heater and the heat sink.

BRIEF DESCRIPTION OF THE DRAWINGS

These and other aspects and features of embodiments of the present invention will be better understood after a reading of the following detailed description, together with the attached drawings, wherein.

DETAILED DESCRIPTION

Figure 1:
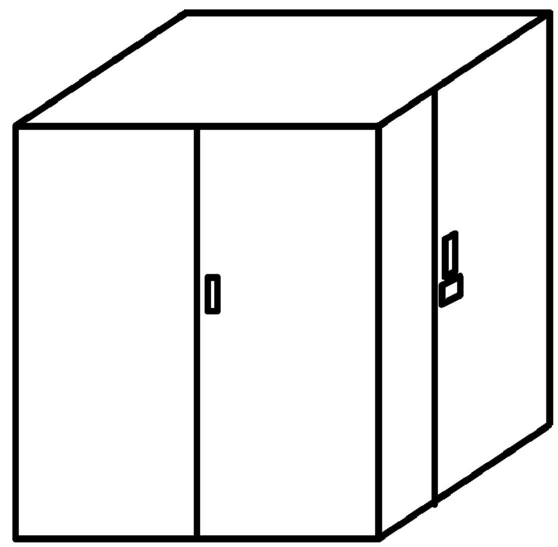
FIG. 1 is a perspective view of a cabinet, according to an embodiment of the invention.

The present invention now is described more fully hereinafter with reference to the accompanying drawings, in which aspects are shown. This invention may, however, be embodied in many different forms and should not be construed as limited to the aspects set forth herein; rather, these aspects are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular aspects only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof. As used herein, the term “and/or” includes any and all combinations of one or more of the associated listed items. As used herein, phrases such as “between X and Y” and “between about X and Y” should be interpreted to include X and Y. As used herein, phrases such as “between about X and Y” mean “between about X and about Y.” As used herein, phrases such as “from about X to Y” mean “from about X to about Y.”

It will be understood that when an element is referred to as being “on”, “attached” to, “connected” to, “coupled” with, “contacting”, etc., another element, it can be directly on, attached to, connected to, coupled with or contacting the other element or intervening elements may also be present. In contrast, when an element is referred to as being, for example, “directly on”, “directly attached” to, “directly connected” to, “directly coupled” with or “directly contacting” another element, there are no intervening elements present. It will also be appreciated by those of skill in the art that references to a structure or feature that is disposed “adjacent” another feature may have portions that overlap or underlie the adjacent feature.

Spatially relative terms, such as “under”, “below”, “lower”, “over”, “upper”, “lateral”, “left”, “right” and the like, may be used herein for ease of description to describe one element or feature’s relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as “under” or “beneath” other elements or features would then be oriented “over” the other elements or features. The device may be otherwise oriented (rotated 90 degrees or at other orientations) and the descriptors of relative spatial relationships used herein interpreted accordingly.

Exemplary aspects are directed to cabinets for housing electronic equipment, wherein the cabinet includes a fuel cell power backup system, and more particularly, to a fuel cell cabinet having an air feed system for the fuel cell power backup system.

Conventional cabinets and the electronic equipment in the interior of the cabinets commonly are air cooled. The aspects recognize that stabilizing and maintaining a substantially constant fuel cell temperature may increase power density of the fuel cell system. The aspects also may reduce the time needed for the fuel cell to reach full power.

The aspects provide a low cost air feed system for a fuel cell cabinet. The aspects provide redundancy to reduce or eliminate system failures. The aspects improve the efficiency of the fuel cell cabinet. The aspects maintain proper air intake temperatures for the fuel cell, which may enable the fuel cell to achieve faster power output. The aspects also may add or extend the life of the system, for example, by maintaining the intake temperature of the fuel cell at a predetermined temperature or within a desired temperature range for operation, thereby extending the life of the fuel cell.

Exemplary aspects will now be described with reference to FIGS. 1-22.

Figure 2:
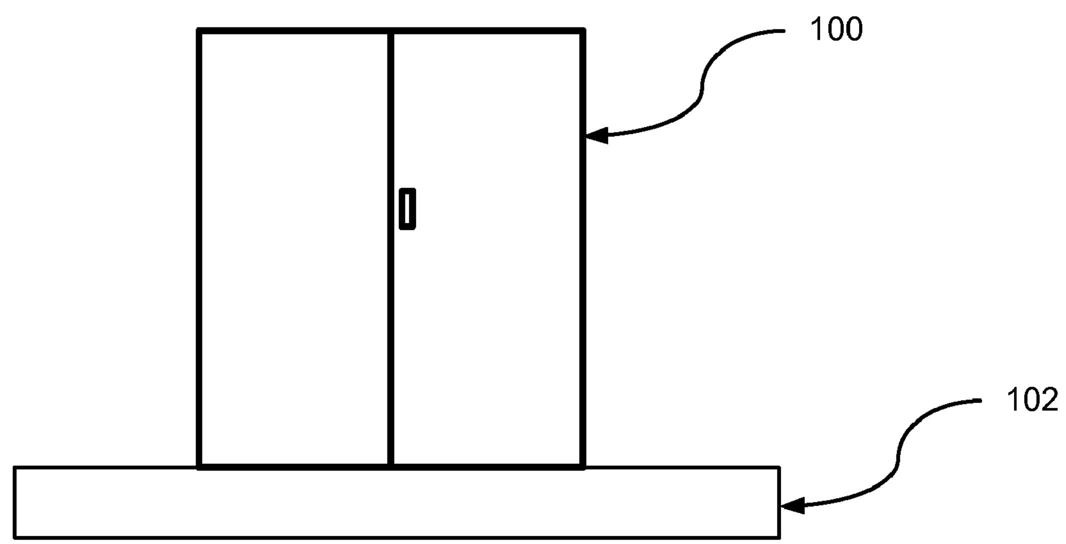
FIG. 2 is a plan view of a cabinet, according to an embodiment of the invention.

A fuel cell cabinet 100 according to an aspect is illustrated in FIGS. 1 and 2. The fuel cell cabinet may house electronic equipment and a connection panel for cross-connecting the electronic equipment with various provider and/or subscriber lines. The fuel cell cabinet 100 includes a fuel cell power backup system.

As shown in FIG. 2, the fuel cell cabinet 100 can be mounted on the surface of, for example, a concrete pad 102. The surface upon which the fuel cell cabinet 100 can be mounted is not limited to a concrete pad 102 and can include any suitable surface, device, or structure, such as a pad or mounting surface formed from fiberglass, plastic, metal, etc. Aspects of the fuel cell cabinet can be mounted in the interior of buildings, structures, etc., or at the exterior of buildings, structures, etc. For example, an aspect of a fuel cell cabinet 100 can be mounted on a rack or shelter or other structure (not shown).

Figure 3:
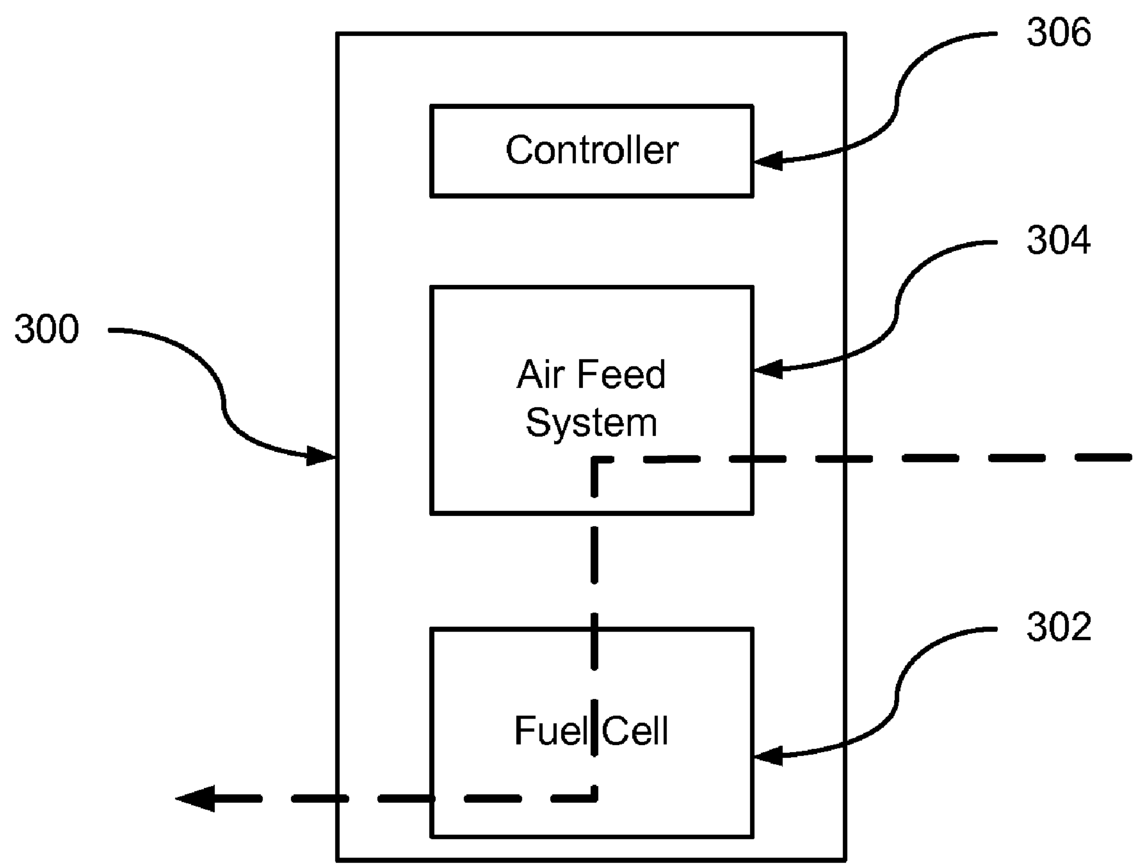
FIG. 3 is a schematic of a cabinet, according to an embodiment of the invention.

As shown in FIG. 3, an exemplary aspect of a fuel cell cabinet 300 includes a fuel cell 302 and an air feed system 304 for maintaining a substantially constant air feed temperature to the fuel cell 302. An aspect of the system includes a controller 306 that selectively controls the temperature of the air in the air feed system.

Figure 4:
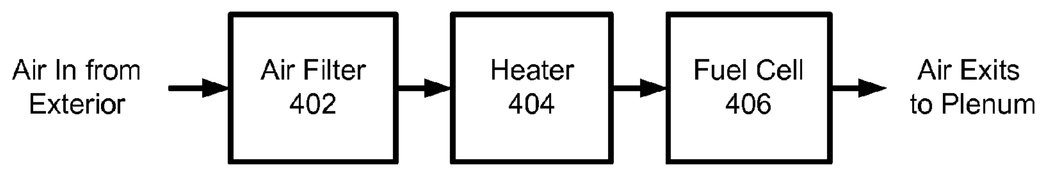
FIG. 4 is a schematic of a cabinet, according to an embodiment of the invention.

As shown in FIG. 4, in an aspect of a fuel cell cabinet 400, air enters from the exterior of the cabinet 400 through an air filter 402. The air is directed to a heater 404 where the air is heated to a predetermined temperature or temperature range. The heated air then enters the fuel cell 406, and then exits the fuel cell 406 to a plenum (not shown).

Figure 5:
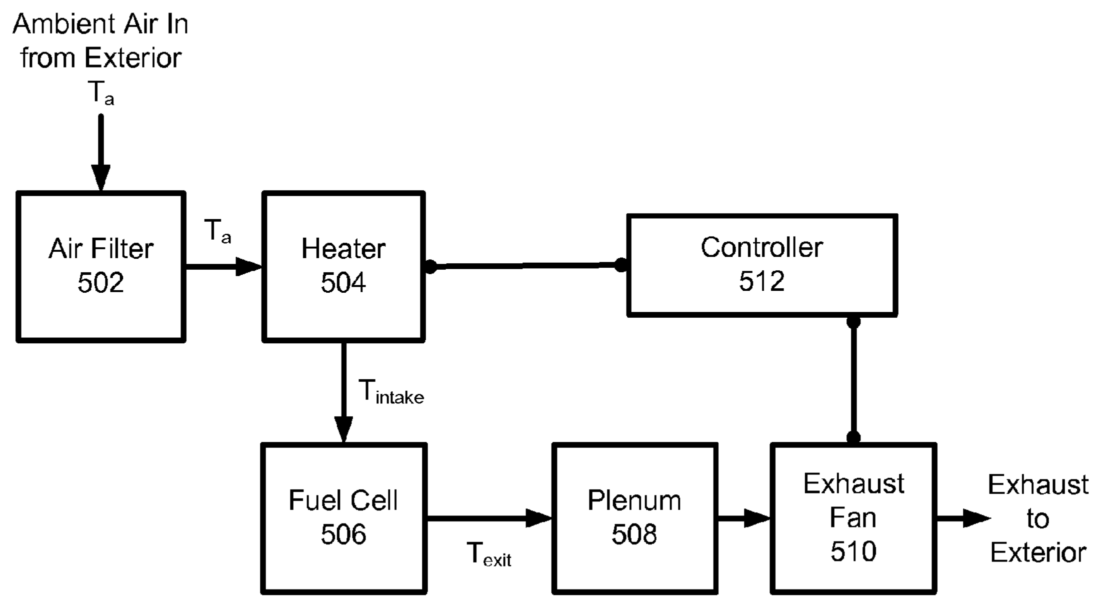
FIG. 5 is a schematic of a cabinet, according to an embodiment of the invention.

FIG. 5 illustrates another aspect of a fuel cell cabinet 500. In this aspect, ambient air having a temperature $T_a$ enters the cabinet from the exterior into, for example, an air filter 502. The ambient air is heated in a heater 504. The heater can be, for example, a resistance type heater or the like. The heated air having a temperature $T_{intake}$ enters the fuel cell 506 and exits the fuel cell 506 to the plenum 508. A blower within the fuel cell 506 draws the air through the system and exhausts the air to the plenum 508. An exhaust fan 510 pulls the air from the plenum 508 and pushes it to the exterior of the cabinet 500. In other aspects, a fan can be employed at other locations throughout the system to achieve the desired flow of air through the system. For example, a fan can be located before or after the air filter 502, or between other elements of the system. One of ordinary skill in the art will recognize that one or more fans can be provided at various locations throughout the system within the spirit or scope of the invention. An aspect of the system includes a controller 512 that selectively controls, for example, the temperature of the air ($T_{intake}$) at the intake to the fuel cell and/or the flow rate of the air flowing through the system. The controller 512 can control the heater 504 and/or the exhaust fan 510.

With reference again to FIGS. 4 and 5, an aspect of the air filter 402 or 502 can be an active filter that can clean particulates and gaseous substances such as sulfur from incoming air.

In another aspect, the heater system (e.g., 404, 504) can include an auto off feature to reduce or eliminate overheating of the heater, for example, beyond a predetermined threshold temperature. In an aspect, the heater 404, 504 can be, for example, a positive temperature coefficient (PTC) type heater.

One of ordinary skill in the art will recognize that the air feed system can be incorporated into the fuel cell cabinet in a variety of ways and may include a number of configurations and elements for providing the air feed system. The present invention is not limited to the exemplary aspects described herein.

Figure 6:
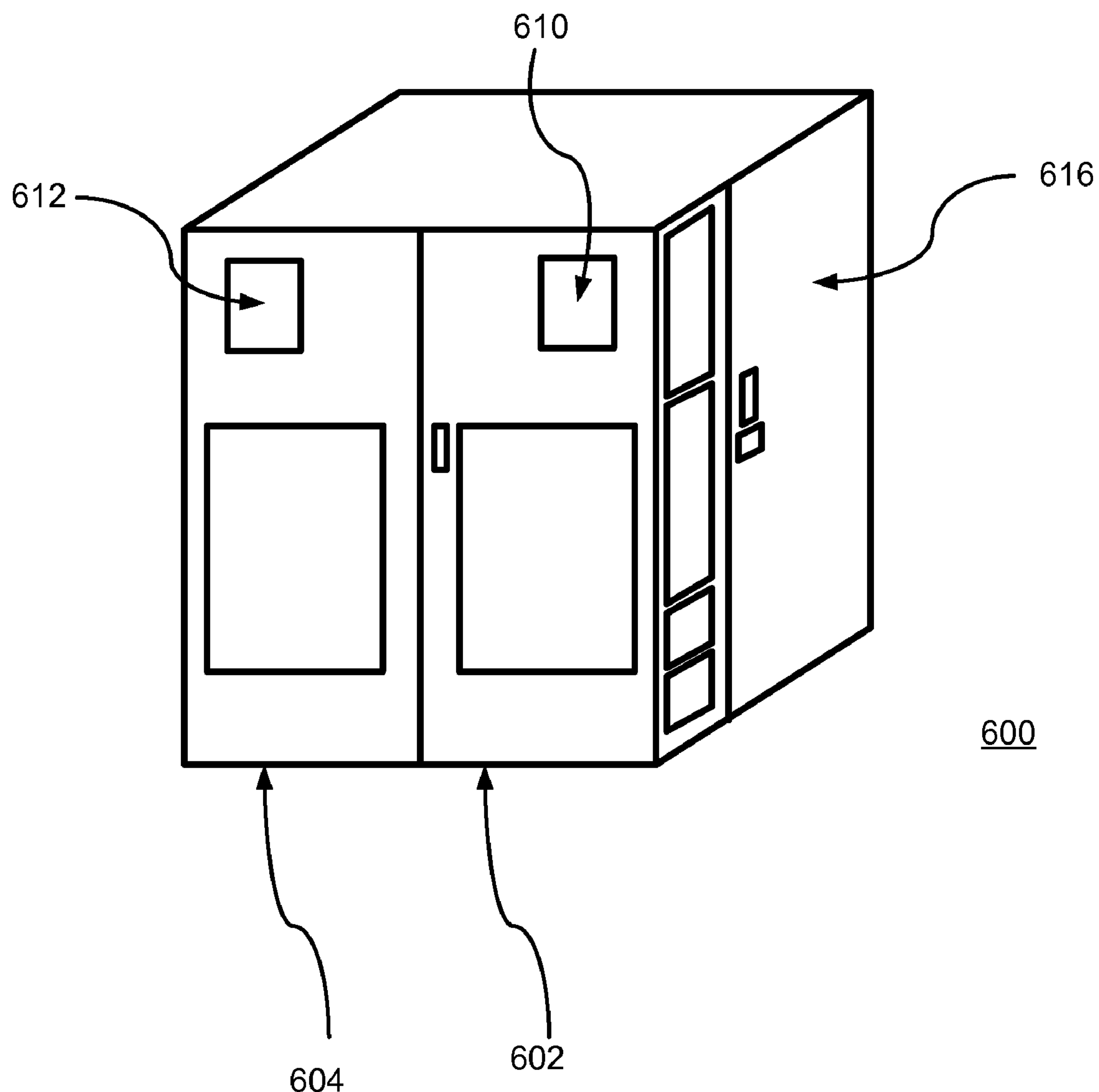
FIG. 6 is a perspective view of a cabinet, according to an embodiment of the invention.

FIG. 6 shows an aspect of a fuel cell cabinet 600 having one or more fuel cells and an air feed system. The fuel cell cabinet 600 includes four sides, a top, and a bottom. The fuel cell cabinet 600 includes one or more doors 602, 604 on a first side of the cabinet 600. The cabinet 600 includes one or more doors 616 on a second side of the cabinet 600. The fuel cell cabinet 600 also may include one or more doors on the third and/or fourth side of the cabinet 600, which are not shown in FIG. 6. The doors 602, 604 include air inlet and door perforations 610 and 612.

Figure 7:
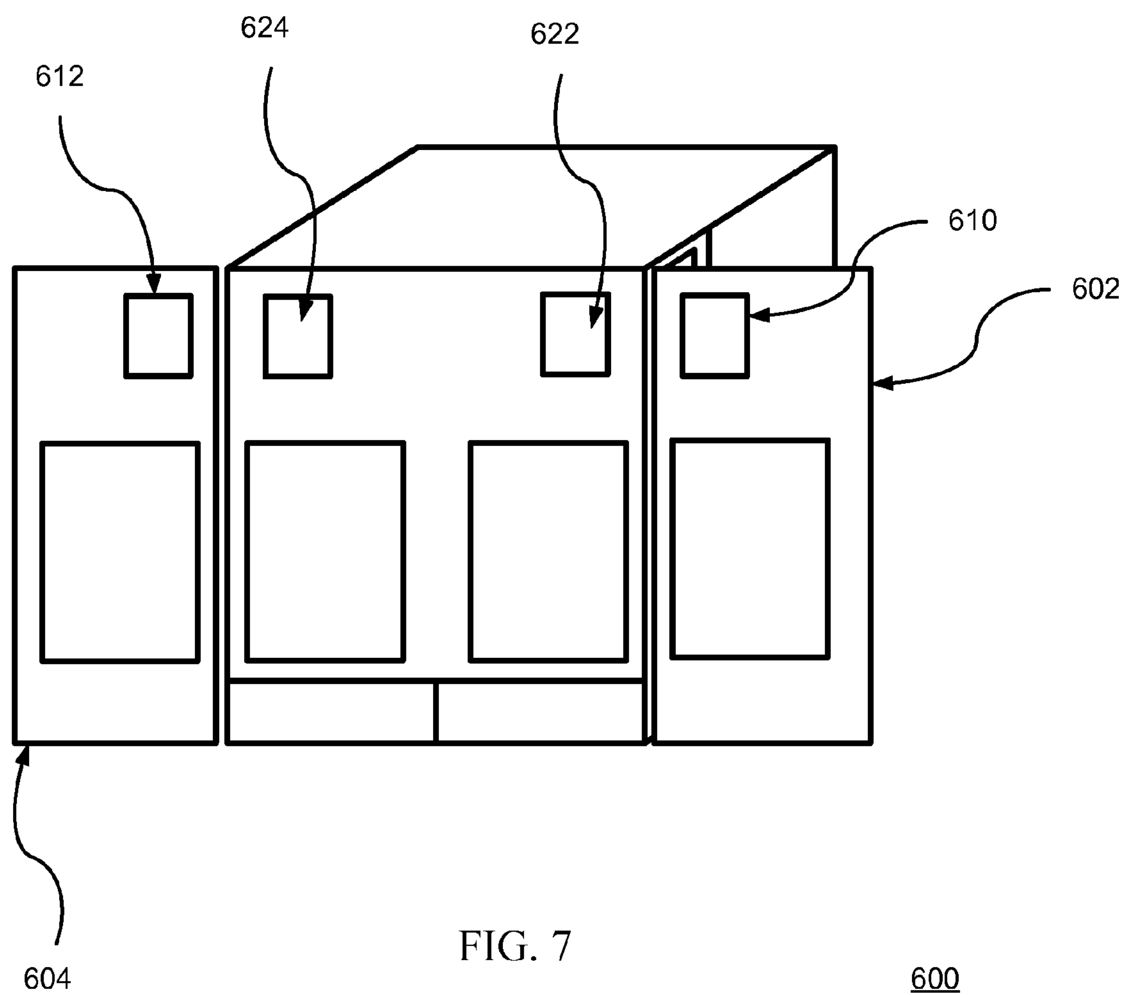
FIG. 7 is another perspective view of the cabinet of FIG. 6.

FIG. 7 shows an aspect of the fuel cell cabinet 600 of FIG. 6 with the doors 602, 604 in an open position. The cabinet 600 includes one or more air filters 622, 624 that cooperate with the air inlets and door perforations 610, 612 of the doors 602, 604. The ambient air from the exterior of the cabinet 600 is drawn through the air filters 622, 624 into the air feed system.

Figure 8:
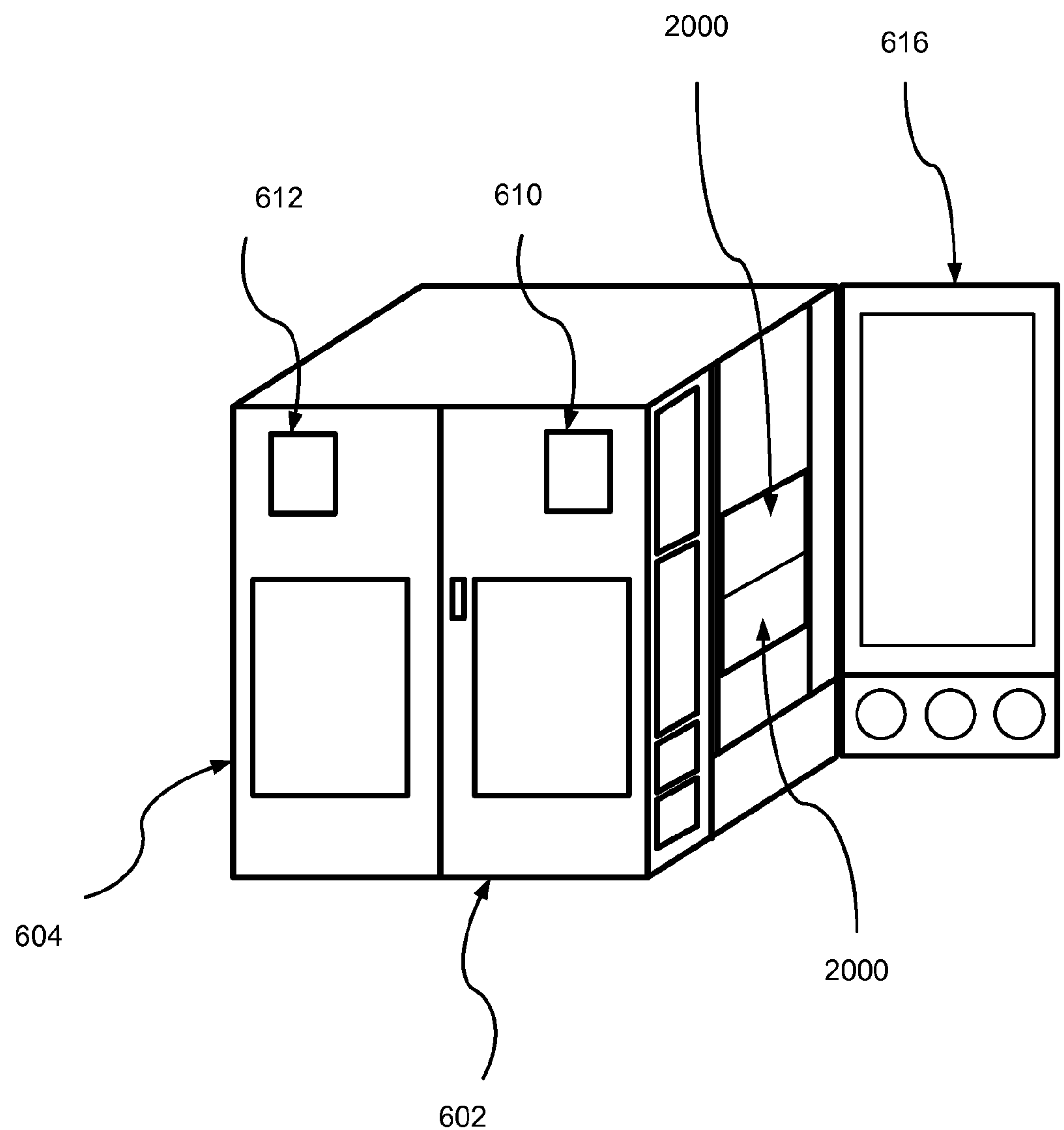
FIG. 8 is another perspective view of the cabinet of FIG. 6.

FIG. 8 shows the fuel cell cabinet 600 of FIG. 6 with the door 616 in an open position. The cabinet 600 includes one or more fuel cells 2000 disposed and mounted in the interior of the cabinet 600. The cabinet may include a rack or shelving system for mounting or securing the fuel cells 2000 inside the cabinet 600. Exemplary aspects of a fuel cell 200 will be described in more detail with reference to FIGS. 20A and 20B.

Figure 9:
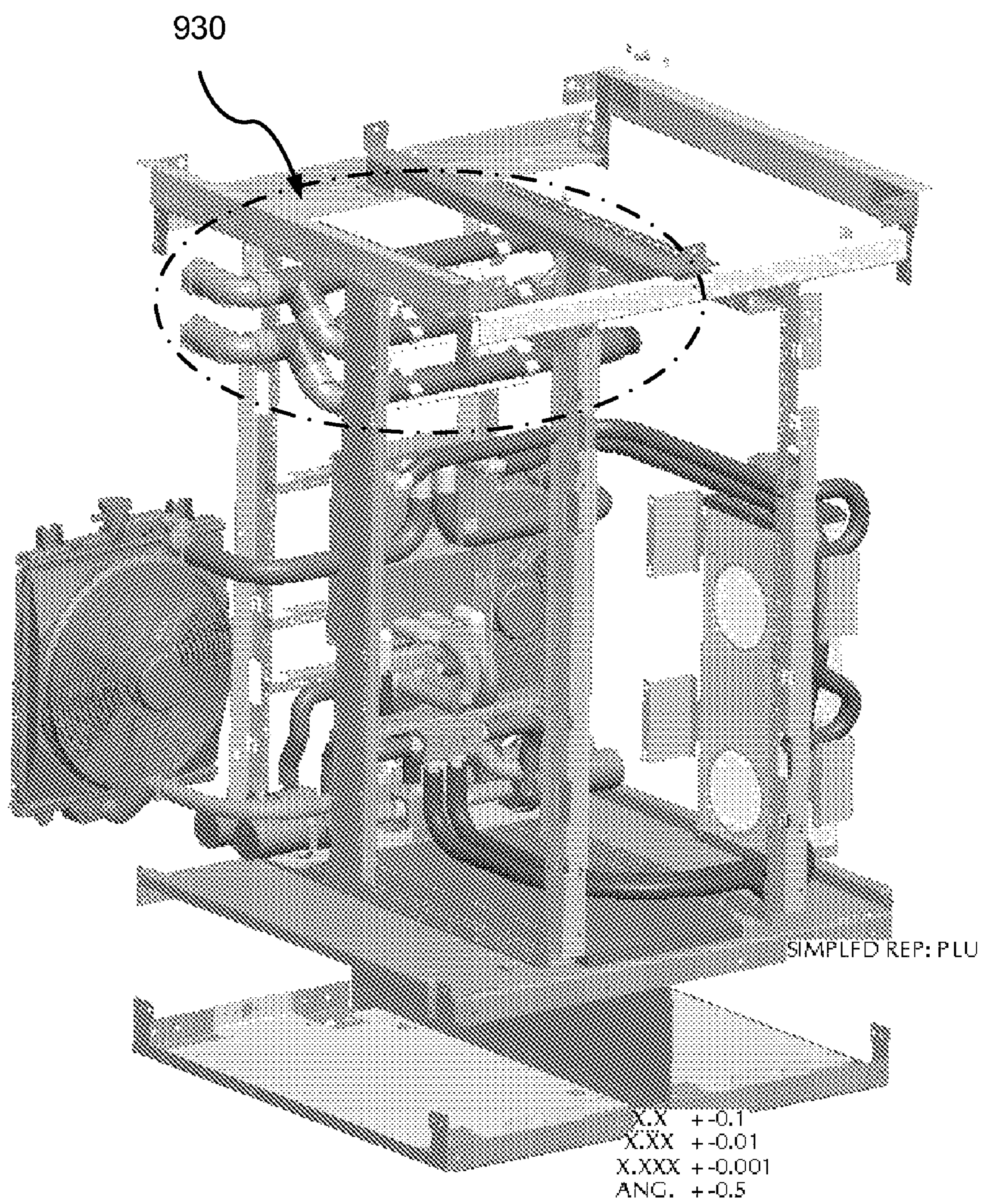
FIG. 9 is a partial, perspective view of a cabinet, according to an embodiment of the invention.
Figure 10:
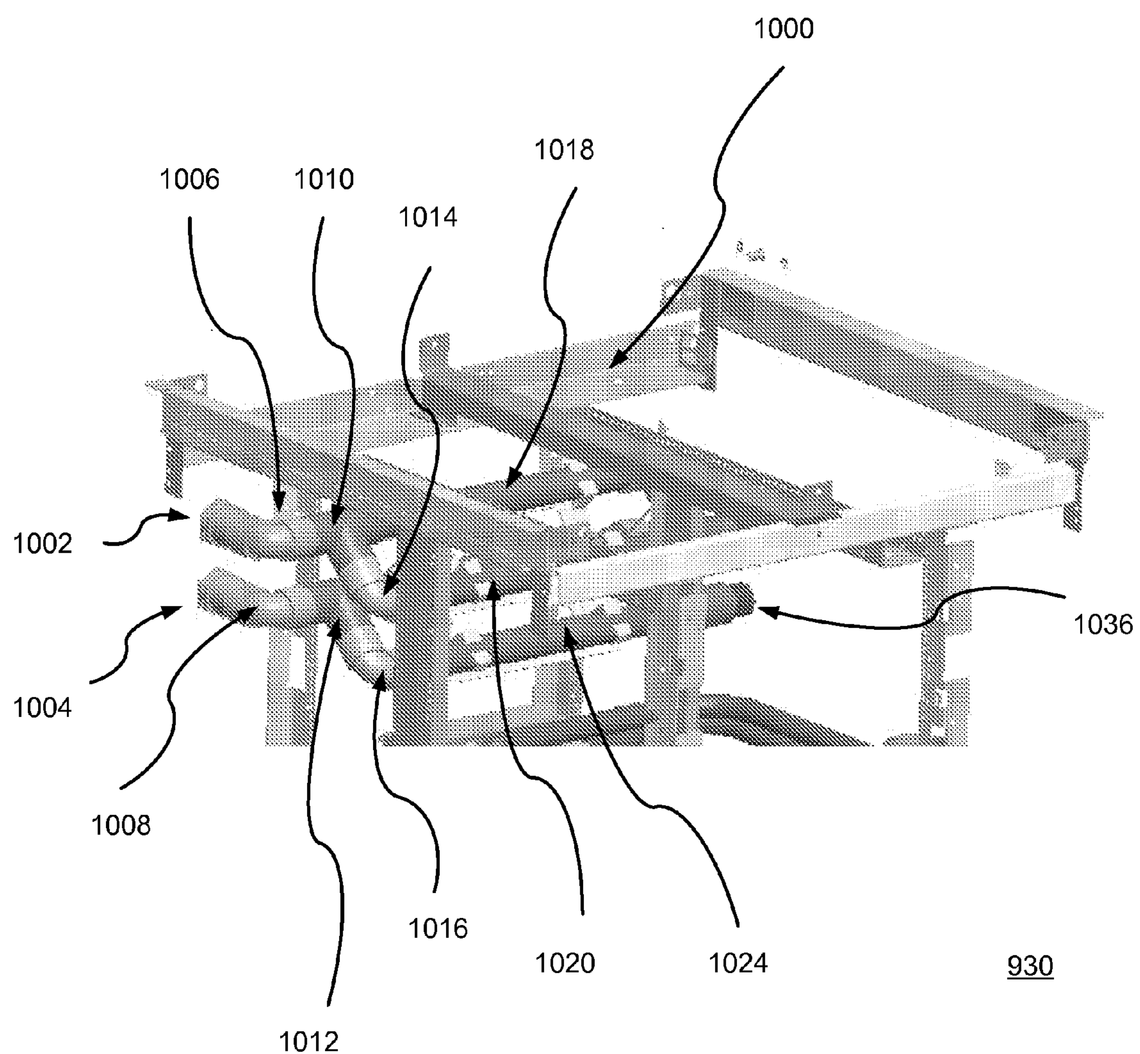
FIG. 10 is a partial, perspective view of a fuel cell cabinet air feed system, according to an embodiment of the invention.
Figure 11:
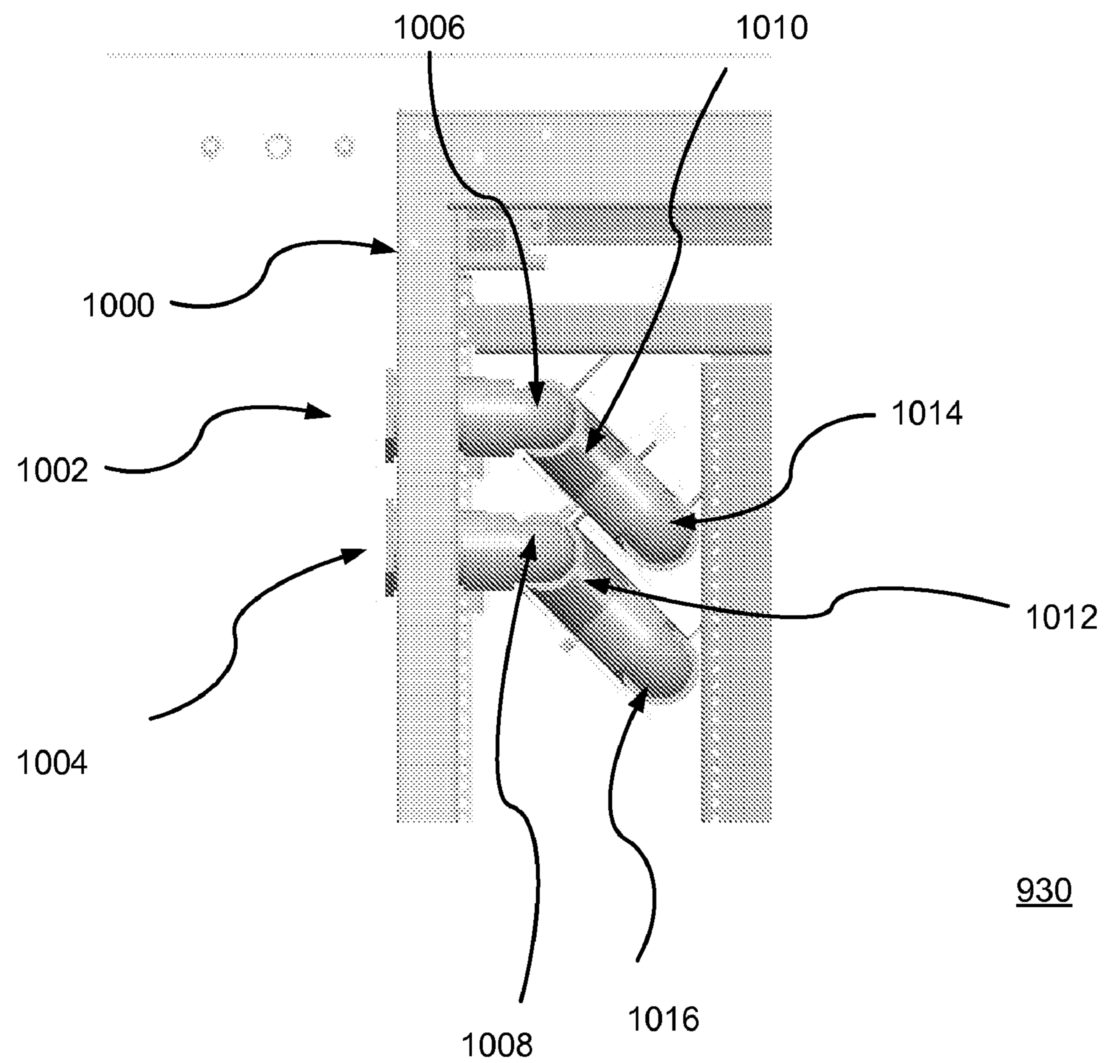
FIG. 11 is a side view of a fuel cell cabinet air feed system, according to an embodiment of the invention.
Figure 12:
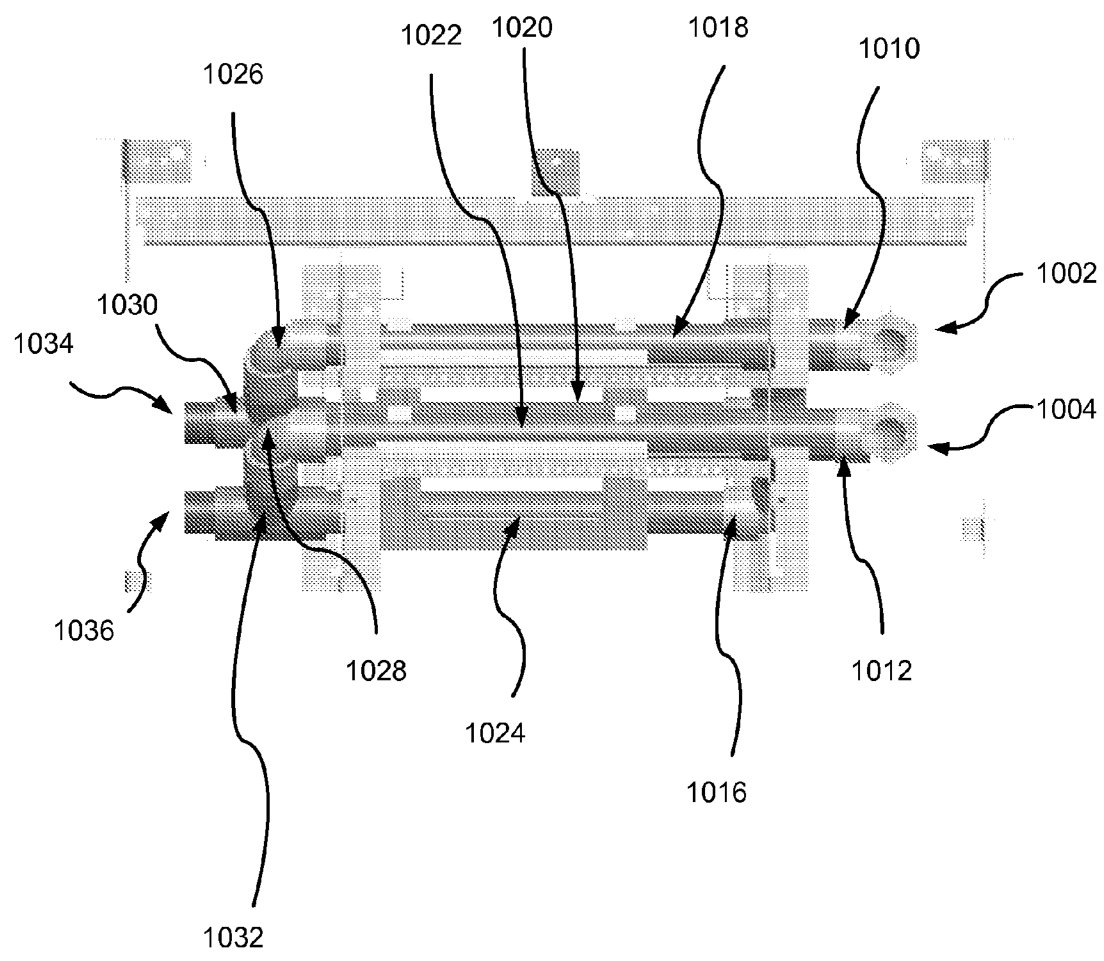
FIG. 12 is a front view of a fuel cell cabinet air feed system, according to an embodiment of the invention.
Figure 13:
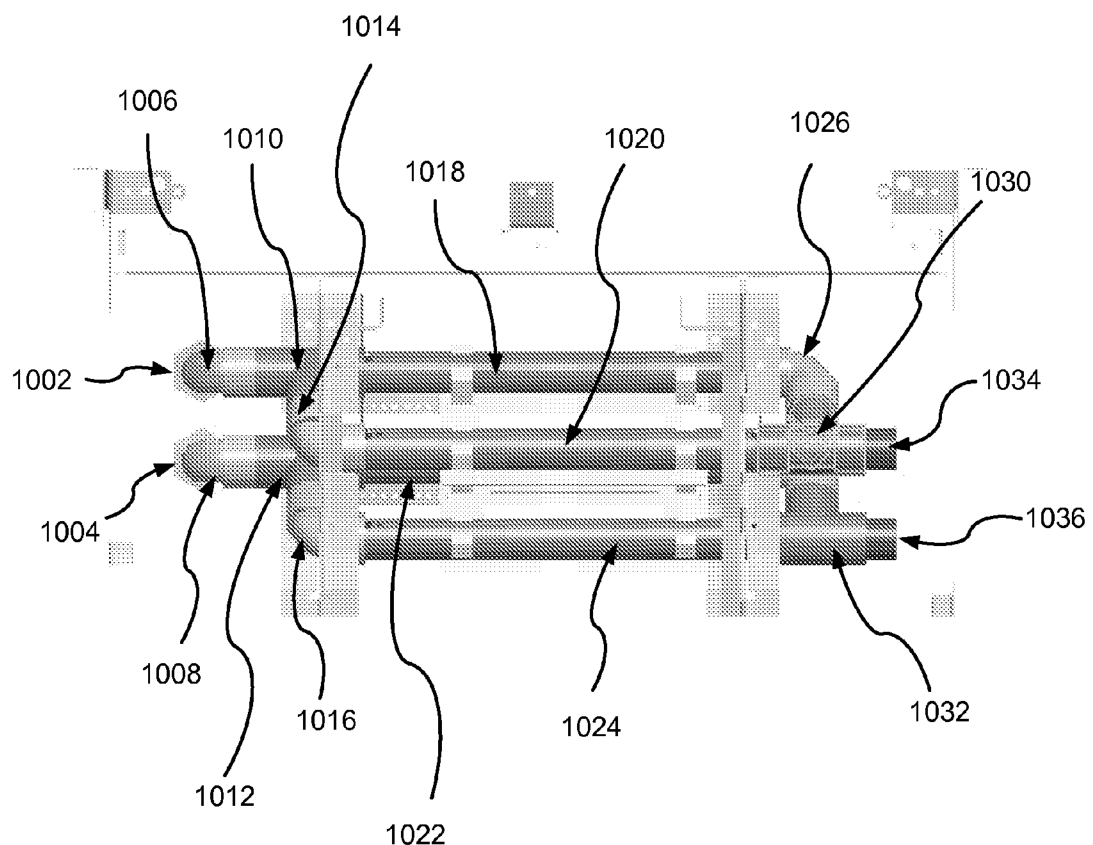
FIG. 13 is a back view of a fuel cell cabinet air feed system, according to an embodiment of the invention.

FIG. 9 shows an aspect of a fuel cell cabinet 900 having an air feed system 930. The fuel cells are not illustrated in FIG. 9.

Exemplary aspects of the air feed system 930 will now be described with reference to FIGS. 10-13. The aspects of FIGS. 10-13 illustrate a redundant air feed system 1000. The tubing is arranged in parallel to provide redundancy. The redundant air feed system 1000 also includes redundant heaters. Other aspects may include a single air feed system or a plurality of air feed systems.

The air feed system 930 includes air inlets 1002 and 1004. The ambient air is drawn through the filters 622, 624 in FIG. 7 into the inlets 1002 and 1004 of the air feed system. The inlets 1002, 1004 are coupled to elbows 1006, 1008, which are coupled respectively to T-haped connectors 1010, 1012. A first end of a heater assembly tube 1018, 1022 is coupled to a first end of the T-shaped connectors 1010, 1012. An elbow 1014, 1016 is coupled to the second end of the T-shaped connectors 1010, 1012. A second end of a heater assembly tube (i.e., redundant heater assembly tube) 1020, 1024 is coupled to the elbow 1014, 1016.

A second end of the heater assembly tube 1018, 1022 is coupled to a first end of a T-shaped connector 1030, 1032. A second end of the heater assembly tube (i.e., redundant heater assembly tube) 1020, 1024 is coupled to the elbow 1014, 1016. An elbow 1026, 1028 is coupled to a second end of the T-shaped connectors 1030, 1032. A third end of the T-shaped connectors 1030, 1032 is connected to air exits 1034, 1036 of the air feed system 930.

Exemplary aspects of the heater assembly tubes 1018, 1020, 1022, 1024 will now be described with reference to FIGS. 14A-19.

Figure 14A:
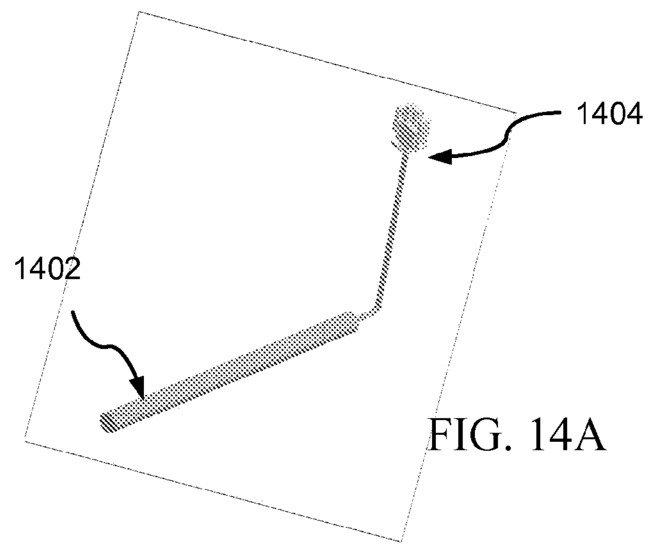
FIG. 14A is a perspective view of a heater assembly, according to an embodiment of the invention.
Figure 14B:
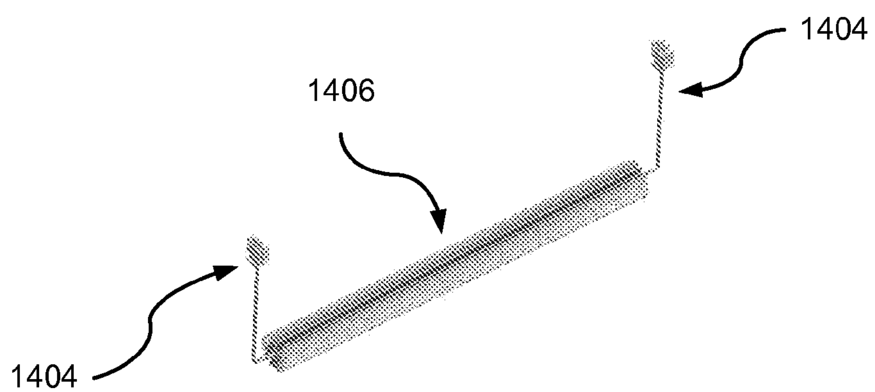
FIG. 14B is a perspective view of a heater assembly, according to an embodiment of the invention.
Figure 14C:
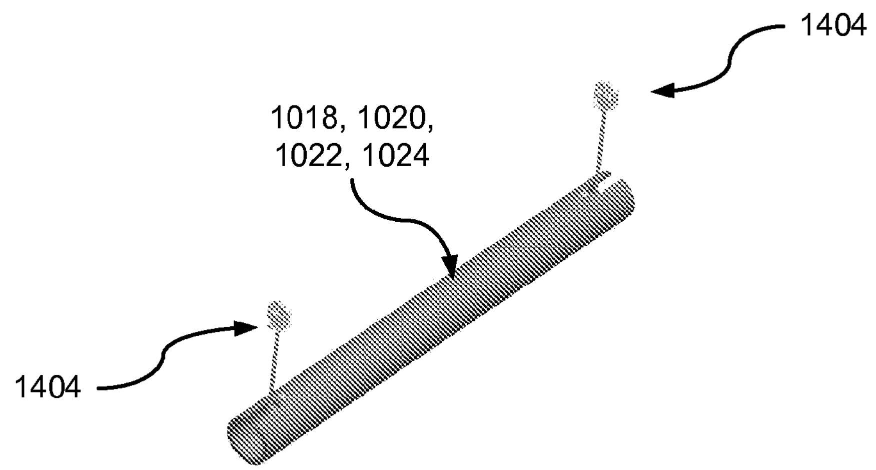
FIG. 14C is a perspective view of a heater assembly, according to an embodiment of the invention.

As shown in FIG. 14A, a heater 1402 is coupled to an electrical connector 1404. The heater 1402 heats the air as the air flows over the heater 1402. In the exemplary aspect illustrated in FIG. 14B, the heater 1402 includes a heat sink 1406 on one or more surfaces of the heater 1402. The electrical connectors 1404 can be provided at each end of the heater 1402. FIG. 14C shows the heater 1402 and heat sink 1406 assembled in a heater assembly tube 1018, 1020, 1022, 1024. The heater assembly tube 1018, 1020, 1022, 1024 can be formed, for example, from a material having a high temperature resistance, such as a high temperature plastic or metal, or other suitable material. The heater assembly tube 1018, 1020, 1022, 1024 can have, for example, a cylindrical or rectangular cross-section or other suitable shaped cross-section.

The aspect illustrated in FIGS. 9-13 includes a series of heaters, such as four resistance type heaters. In this aspect, the system includes two heaters arranged in series and two heaters arranged in parallel. This aspect includes two large cylindrical heat sinks (e.g., 1406, 1406) covering the heaters to aid in the transfer of heat to the air while limiting the air flow resistance within the air feed system. The heat sinks are covered with tubing (e.g., CPVC) to manage the air flow from the outside environment to the fuel cell. The tubing is arranged in a parallel path to provide redundancy.

Figure 15:
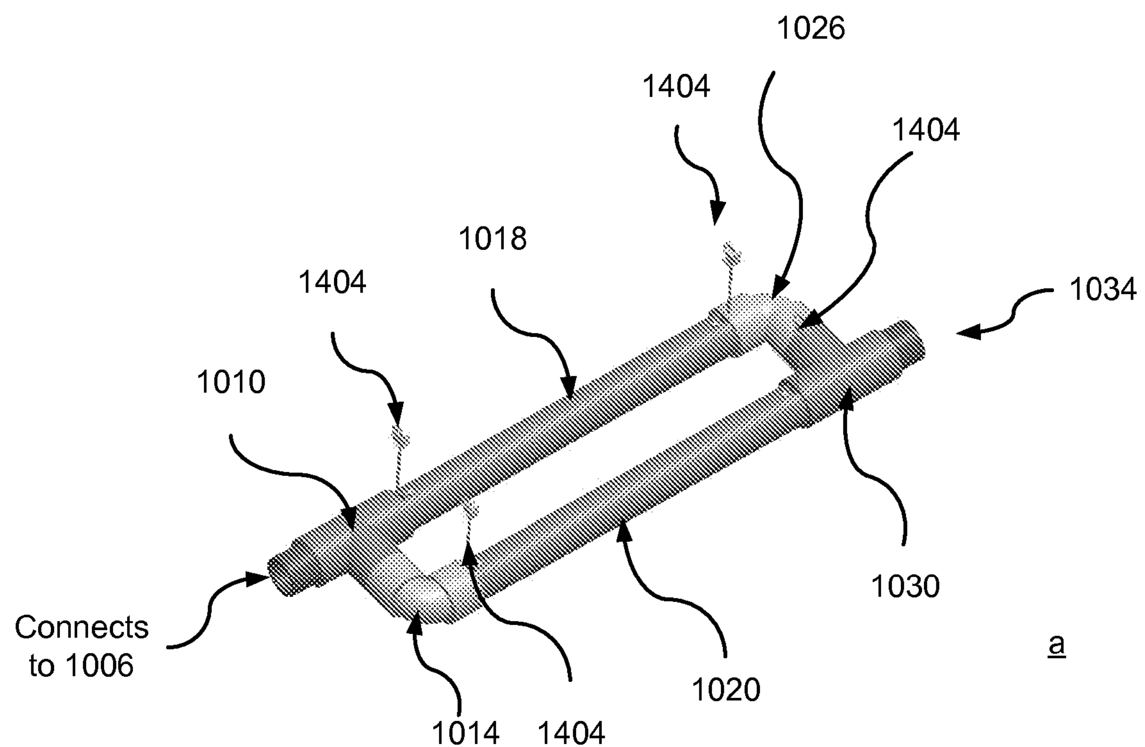
FIG. 15 is a perspective view of a heater assembly, according to an embodiment of the invention.

FIG. 15 shows an assembly of redundant heater assembly tubes (e.g., 1018, 1020) and the corresponding connecting elements (e.g., 1010, 1014, 1026, 1030). The electrical connectors 1404 extend from the heater assembly tubes and are electrically coupled to a controller (e.g., 306, 512). The air is drawn into the heater assembly tubes and over the heater 1402 to increase the temperature of the air at the intake or intakes of the fuel cells.

Figure 16A:
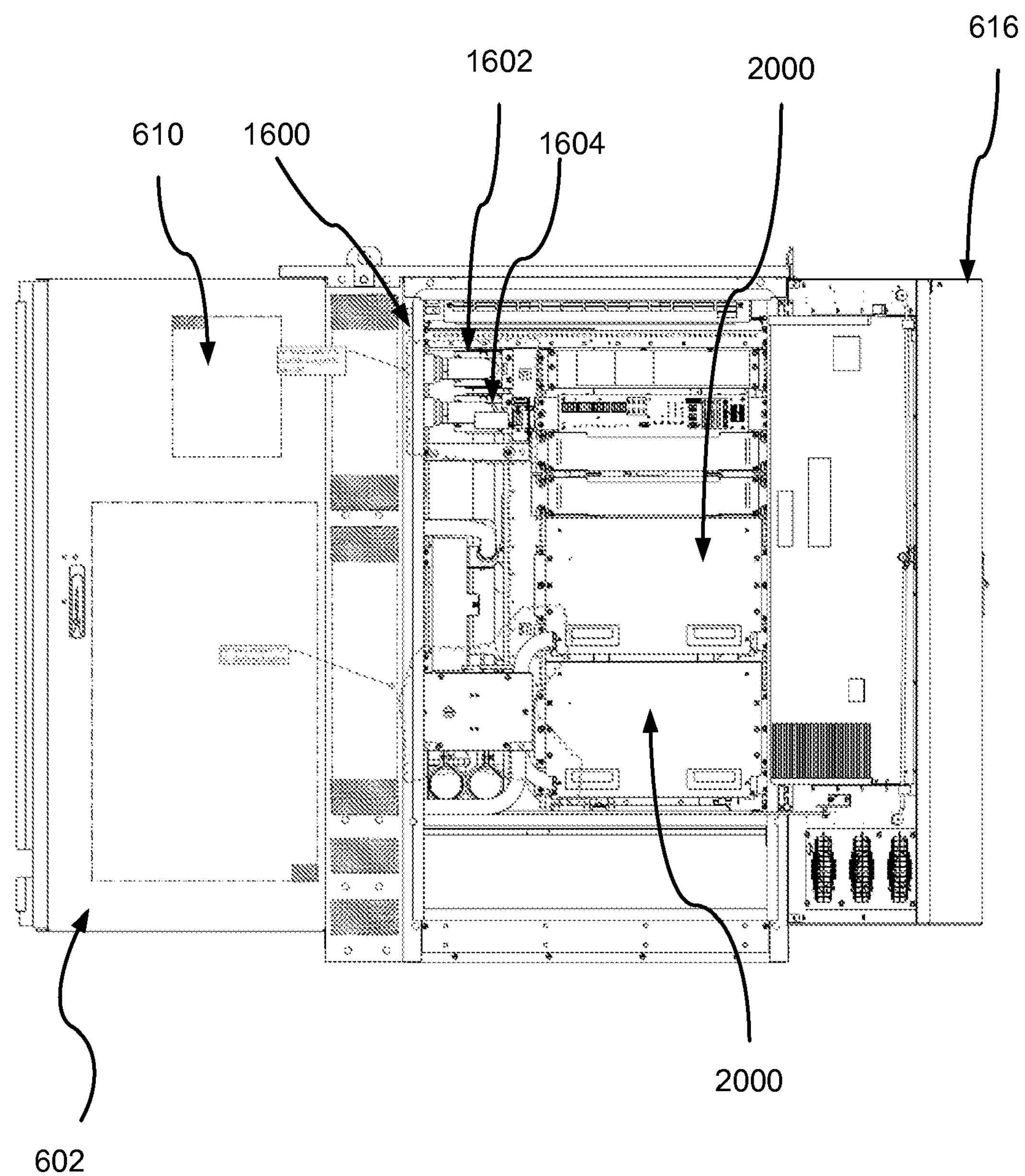
FIG. 16A is an elevation view of a fuel cell cabinet air feed system, according to an embodiment of the invention.
Figure 16B:
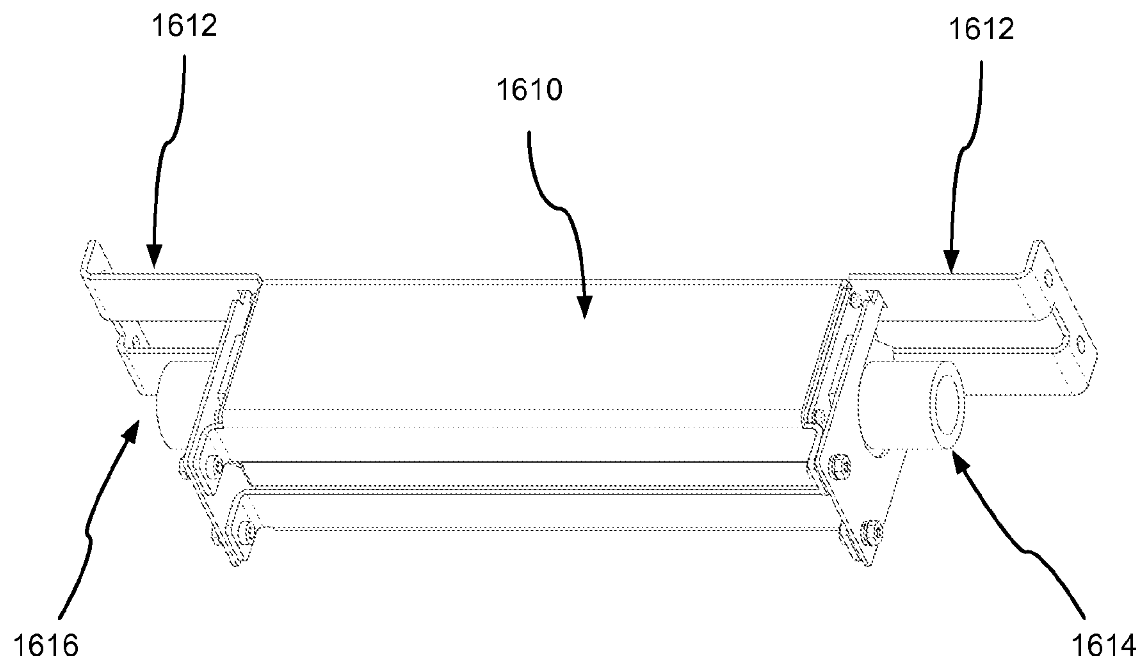
FIG. 16B is a perspective view of a heater assembly, according to an embodiment of the invention.

FIG. 16A illustrates an aspect of a fuel cell cabinet 600 having an air feed system 1600. The air feed system 1600 includes redundant heater assemblies 1602 and 1604. FIG. 16B illustrates an exemplary heater assembly 1602, 1604.

The heater assembly 1602, 1604 can include a housing 1610 having a rectangular cross-section. In other aspects, the cross-section of the housing 1610 can be a circular shape, an oval shape, a square shape, or another shape. The housing 1610 can be, for example, a plastic or metal or a high temperature plastic or metal, or other suitable material. The housing 1610 can include support brackets 1612 for coupling the heater assembly 1602, 1604 to a frame or support structure of the fuel cell cabinet 600.

One or more heaters (not shown) are encapsulated in the interior of the housing 1610. The heater assembly 1602, 1604 can be coupled to an electrical connector (not shown).

The heater assembly 1602, 1604 includes an inlet 1614 that receives intake air. The one or more heaters in the interior of the housing 1610 heat the air as the air flows through the housing 1610 and over the one or more heaters. The heated air then exits the heater assembly 1602, 1604 via an outlet 1616 of the housing 1610 and is supplied to the one or more fuel cells 2000.

Figure 17:
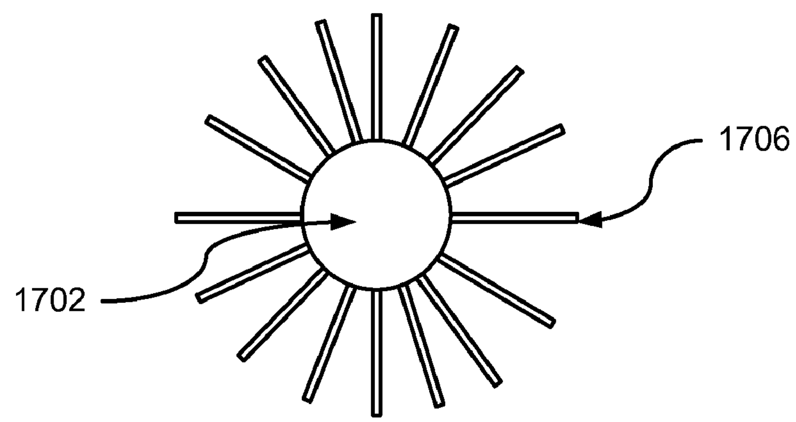
FIG. 17 is a cross-section view of a heater assembly, according to an embodiment of the invention.

For example, FIG. 17 illustrates an aspect of a heater having a circular-shaped rod 1702. This aspect includes a heat sink 1706 formed on the surface of the rod 1702.

Figure 18:
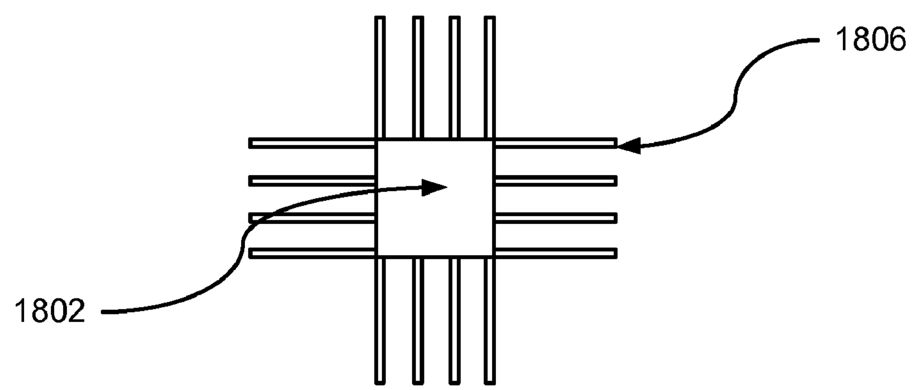
FIG. 18 is a cross-section view of a heater assembly, according to an embodiment of the invention.

FIG. 18 illustrates an aspect of a heater having a square-shaped rod 1802. This aspect includes a heat sink 1806 formed on the surface of the rod 1802.

Figure 19:
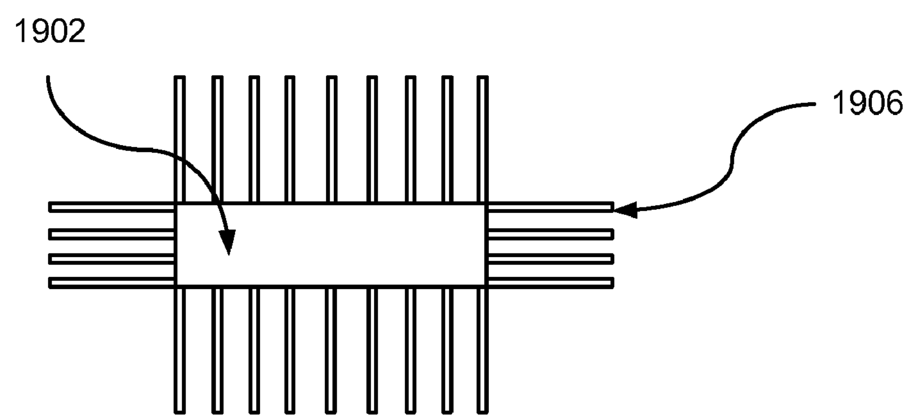
FIG. 19 is a cross-section view of a heater assembly, according to an embodiment of the invention.

FIG. 19 illustrates an aspect of a heater having a rectangular-shaped rod 1902. This aspect includes a heat sink 1906 formed on the surface of the rod 1902.

Figure 20A:
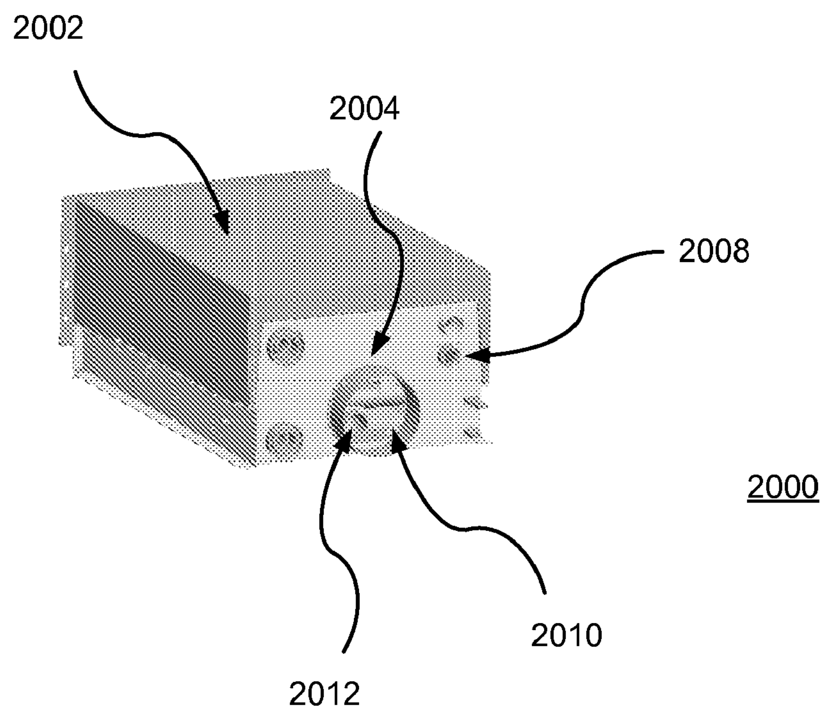
FIG. 20A is another perspective view of the fuel cell assembly, according to an embodiment of the invention.
Figure 20B:
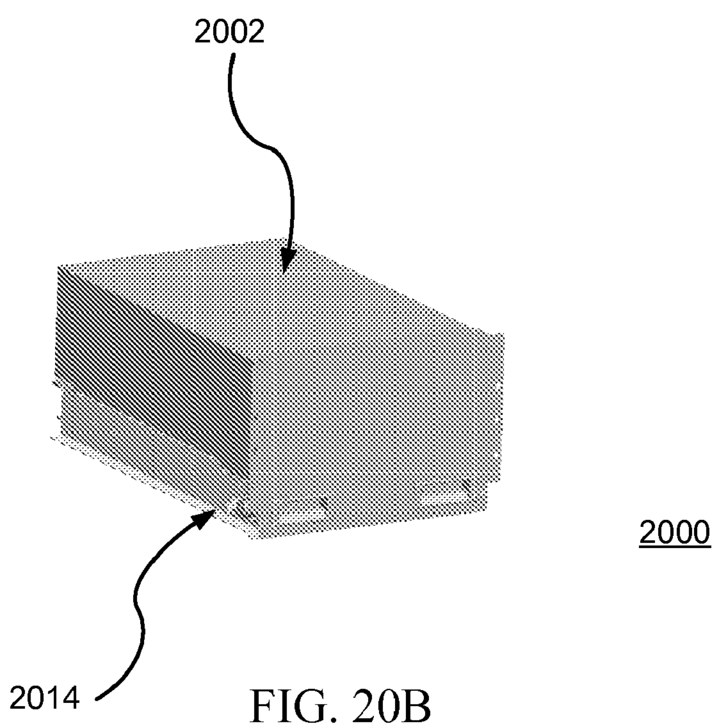
FIG. 20B is another perspective view of the fuel cell assembly, according to an embodiment of the invention.

An exemplary aspect of a fuel cell 2000, which can be mounted or secured in the exemplary cabinet 600, will be described with reference to FIGS. 20A and 20B. The fuel cell 2000 includes a sealed fuel cell enclosure 2002. The fuel cell enclosure 2002 includes an air feed fittings 2008 and 2014 for permitting air to enter the fuel cell 2000. The enclosure 2002 includes a plenum sealing collar 2004 for sealing a first end of the fuel cell 2000 to the plenum 928 of FIGS. 9 and 21B for hydrogen declassification. The plenum sealing collar includes a cathode exhaust 2012 and an anode exhaust 2010. The fuel cell 2000 can be, for example, an 8 kW fuel cell. In an aspect, two 8 kW fuel cells 2000 can be used to provide 16 kW.

Figure 21A:
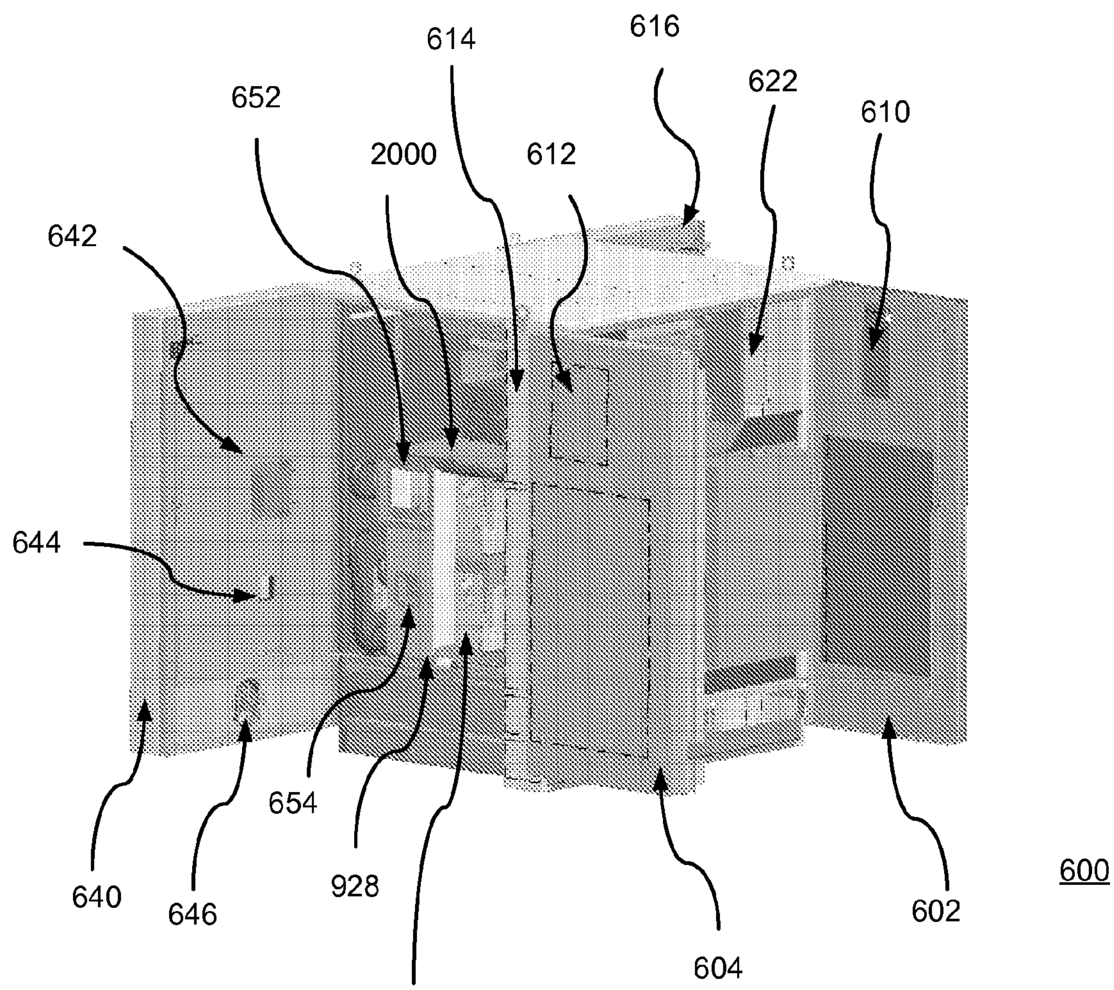
FIG. 21A is another perspective view of the cabinet of FIG. 6.
Figure 21B:
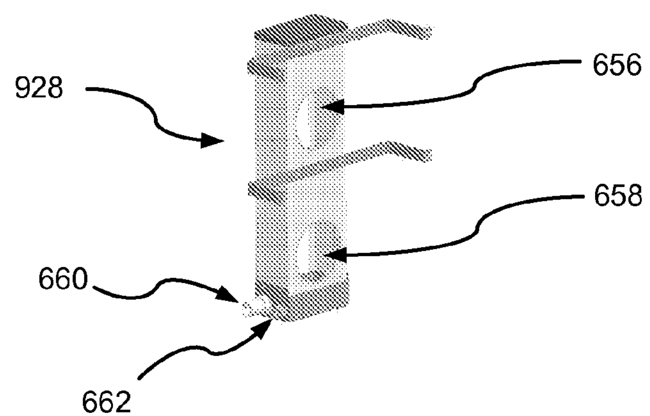
FIG. 21B is perspective view of a plenum, according to an embodiment of the invention.

FIG. 21A illustrates another view of the cabinet 600 of FIG. 6. As shown in FIG. 21A, the cabinet 600 includes an access door 640 having a fan system 642, 644, 646 that draws air through a plenum 928 to exhaust the air from the cathode side of the fuel cell. The plenum 928 includes air exits 652, 654 that seal against the door 640 and fan system 642, 644. As illustrated in FIG. 21B, the plenum 928 includes intakes 656, 658 that seal against plenum sealing collar 2004 of the fuel cells 2000.

Figure 22:
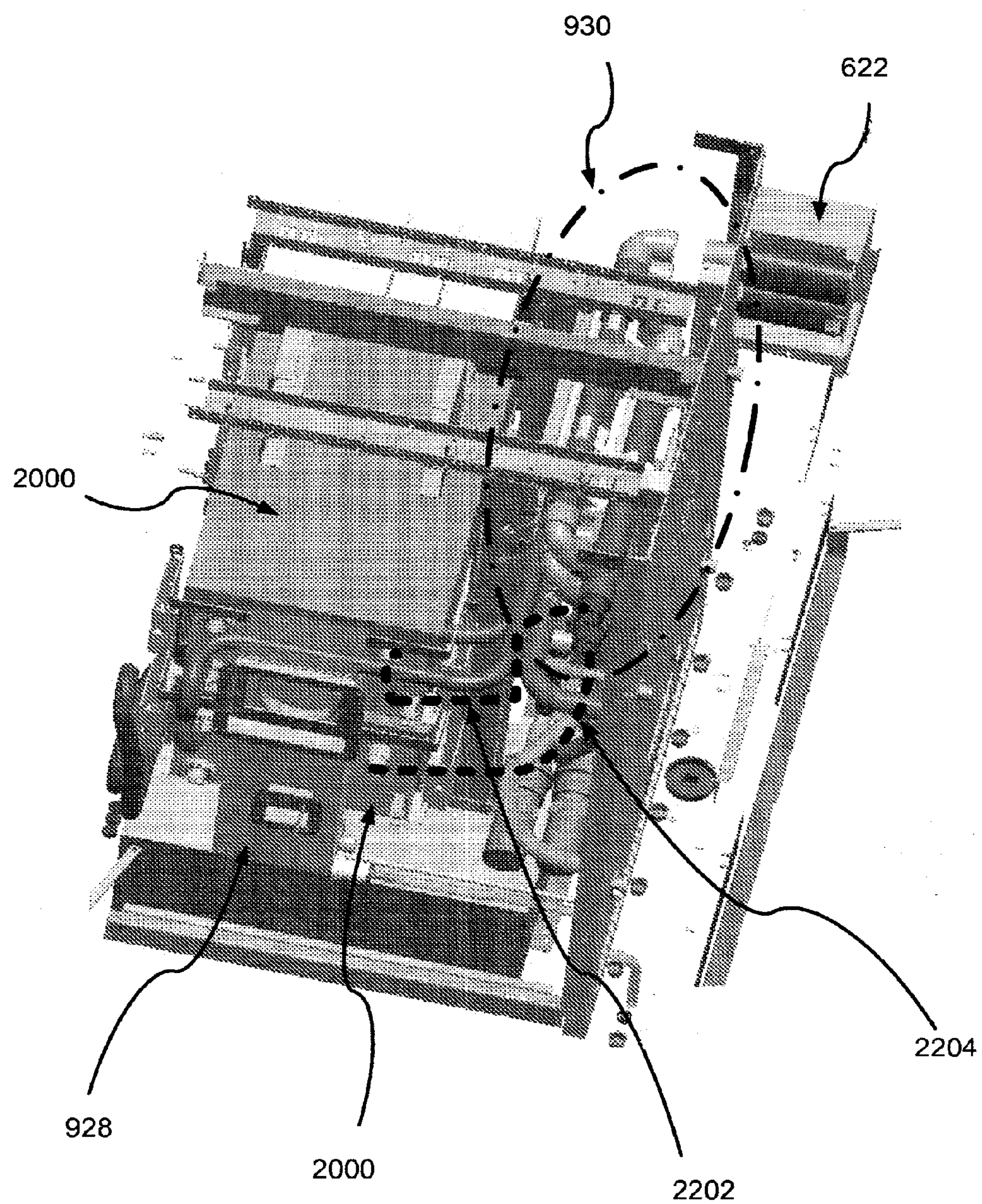
FIG. 22 is another perspective view of the cabinet of FIG. 6.

FIG. 22 is a perspective view illustrating an exemplary arrangement of the air filter 622, the air feed system 930, the fuel cells 2000, and the plenum 928 in the cabinet 600. The lines coupling the air feed system 930 to the air feed fittings 2008, 2014 of the fuel cells 2000 are illustrated by dashed lines 2202 and 2204 in FIG. 22. One of ordinary skill in the art will recognize that air feed system 930 can be coupled to the air feed fittings 2008, 2014 of the fuel cells 2000 by a variety of means, including but not limited to, tubing, pipes, plenums, etc.

The exemplary aspects described herein provide a fuel cell cabinet that houses electronic equipment and that includes a fuel cell power backup system.

The exemplary fuel cell cabinets having an air feed system for controlling the temperature of the air at the intake to the fuel cell power backup system.

An example of the operation of a fuel cell cabinet according to an aspect will now be described. An aspect of the system operates via a controller (e.g., controller 306, 512) to turn the heaters of the air feed system and/or the fan system (e.g., 642, 644, 646) ON and OFF to control or maintain the air temperature at the intake to the fuel cell (e.g., 2000) at a predetermined temperature or within a predetermined temperature range. As described herein, the air intake temperature can be based on factors including, but not limited to, the number of fuel cells, the type of fuel cells, the output of the fuel cells, the outside temperature or environmental temperature of the cabinet, the climate in which the cabinet is deployed, etc.

For application in a telecom environment, an aspect controls or maintains the air feed temperature $T_{intake}$ to the fuel cell 2000 such that the air feed temperature $T_{intake}$ is greater than 0° C. The air feed flow rate is controlled to be less than or equal to 45 l/min. In a telecom environment, the system provides important advantages of reducing or preventing system failures by providing redundancy in the air feed system, such as redundant heaters and redundant heater assemblies.

More particularly, in an aspect for use in a telecom environment, the system can operate in ambient conditions of between −40° C. and +46° C. In this environment, the system should not heat the air past +50° C., with a target temperature range between 15° C. to 45° C. This exemplary aspect heats the ambient air from −40° C. to 0° C. and provides a varying air flow rate between 5 l/min and 45 l/min.

The operation of an exemplary system according to an aspect will now be described with reference to Table 1.1 below. Table 1.1 exemplarily illustrates the minimum number of heaters required to heat the intake air based on the power requirement of the fuel cell(s), the outside temperature (i.e., ambient air temperature), and the air flow rate of the air feed system.

TABLE 1.1

Preheat Need as a function of Power, Exterior Ambient Temperature, and Flow Rate

| | Fuel Cell Power requirement | | | |
|---|---|---|---|---|
| | 8 kw | 6 kw | 4 kw | 2 kw |
| | Number of stage heaters turned on | | | |
| −40 | 3 | 2 | 2 | 1 |
| −30 | 2 | 2 | 1 | 1 |
| −20 | 2 | 1 | 1 | 1 |
| −10 | 1 | 1 | 1 | 1 |
| 0 | 1 | 1 | 1 | 1 |

The air feed system according to the invention provides a low cost system that can provide redundancy for minimizing or eliminating failures. The air feed system also can increase the efficiency of the fuel cell power backup system by heating the air to a desired temperature within, for example, twenty (20) seconds, including cases in which the flow rate is at a highest level and the temperature is at a lowest level. The time needed to heat the air to the desired or predetermined temperature varies depending on the flow rate and ambient temperature.

Other aspects can include a thermal fuse to reduce or eliminate failures and provide fail safe (safety) operation of the fuel cell cabinet system. For example, an electrical connection 1404 can include a thermal fuse.

Other aspects also can select or optimize the air flow rates and air resistance in the air feed system. For example, the shape of the heater and the heat sinks can be selected to optimize air flow rates and air resistance. As another example, the exhaust fan (or alternatively, a supply fan or blower) can be selected to optimize air flow rates and air resistance. The exhaust fan or blower can be selected or optimized to reduce costs (e.g., manufacturing costs, operational costs, etc.). The size, shape, and number of heat sinks provided on the heaters also can be selected or optimized to reduce costs and increase the efficiency of heat transfer to the air in the air feed system.

The present invention has been described herein in terms of several preferred aspects. However, modifications and additions to these aspects will become apparent to those of ordinary skill in the art upon a reading of the foregoing description. It is intended that all such modifications and additions comprise a part of the present invention to the extent that they fall within the scope of the several claims appended hereto. Furthermore, although elements of the invention may be described or claimed in the singular, the plural is contemplated unless limitation to the singular is explicitly stated.

What is claimed is:

1. A cabinet comprising:

electronic equipment housed within said cabinet, wherein said electronic equipment is for connection to subscriber lines or provider lines; and a fuel cell power backup system providing backup power to said electronic equipment in the case of a power failure, wherein said fuel cell power backup system is contained in an interior of said cabinet and wherein said fuel cell power backup system includes:

a fuel cell disposed inside said cabinet generating the backup power during operation;

an air feed system with an air inlet drawing ambient air from outside of said cabinet during operation, an air exit providing air to enter said fuel cell, a passageway connecting said air inlet to said air exit, and a heater disposed within said air feed system; and a controller that controls said air feed system and maintains a predetermined temperature range of the air entering said fuel cell.

2. The cabinet according to claim 1, wherein said air feed system includes redundant air feed systems.

3. The cabinet according to claim 1, wherein said heater is a resistance heater.

4. The cabinet according to claim 1, further comprising:

a heat sink on said heater.

5. The cabinet according to claim 1, further comprising:

a heat sink on a plurality of surfaces of said heater.

6. The cabinet according to claim 1, further comprising:

a housing that surrounds said heater, wherein said housing manages air flow of ambient air over said heater.

7. The cabinet according to claim 1, wherein said heater includes redundant heaters.

8. The cabinet according to claim 1, further comprising:

a fan that draws ambient air from outside of said cabinet through said air feed system and into said fuel cell.

9. The cabinet according to claim 8, wherein said heater heats the ambient air to a predetermined intake air temperature or air temperature range prior to entering said fuel cell.

10. The cabinet according to claim 8, wherein said fan exhausts air from said fuel cell to the outside of said cabinet.

11. The cabinet according to claim 2, wherein said redundant air feed systems include parallel paths of housing sections that manage flow of air, wherein each of said housing sections includes a heater, and wherein each of said housing sections manages flow of the air over said heater.

12. The cabinet according to claim 2, wherein each of said redundant air feed systems includes a heater having a heat sink.

13. The cabinet according to claim 12, wherein two heaters are arranged in series.

14. The cabinet according to claim 12, wherein two heaters are arranged in parallel.

15. The cabinet according to claim 1, wherein said controller selectively turns said heater ON and OFF to control an intake air temperature at said fuel cell.

16. The cabinet according to claim 3, wherein said controller selectively turns said heater ON and OFF to control a temperature of air exiting said air feed system.

17. The cabinet according to claim 1, wherein said heater includes two heaters arranged in series or two heaters arranged in parallel.

18. A cabinet comprising:

electronic equipment housed within said cabinet, wherein said electronic equipment is for connection to subscriber lines or provider lines; and a fuel cell power backup system providing backup power to said electronic equipment in the case of a power failure, wherein said fuel cell power backup system is contained in an interior of said cabinet and wherein said fuel cell power backup system includes:

a fuel cell disposed inside said cabinet generating the backup power during operation;

an air feed system with an air inlet drawing ambient air from outside of said cabinet during operation, said air inlet being coupled to a first connector, said first connector being connected to a first end of a first passageway and also being connected to a first end of a second passageway, a second end of said first passageway and a second end of said second passageway being connected to a second connector, to thereby create parallel airways between said first connector and said second connector, and an air exit coupled to said second connector providing air to said fuel cell; and at least one heater provided in one of said first and second passageways.

19. The cabinet according to claim 18, wherein said first connector is a first T-shaped connector, and wherein said second connector is a second T-shaped connector.

20. The cabinet according to claim 19, wherein said first end of said second passageway is coupled to said first T-shaped connector via a first elbow, and said second end of said second passageway is coupled to said second T-shaped connector via a second elbow.

21. The cabinet according to claim 18, wherein said first and second passageways are tubes.

22. The cabinet according to claim 21, wherein said tubes are formed of CPVC.

23. The cabinet according to claim 18, further comprising:

an active filter upstream of said air inlet that cleans particulates and gaseous substances from the ambient air.

24. The cabinet according to claim 18, wherein said at least one heater is a first heater located within said first passageway.

25. The cabinet according to claim 24, further comprising:

a second heater located within said second passageway.

26. The cabinet according to claim 25, wherein said first and second heaters are electrically powered, resistive heaters.

27. The cabinet according to claim 25, wherein said first and second heaters are positive temperature coefficient (PTC) type heaters.

28. The cabinet according to claim 24, wherein said air inlet is a first air inlet and said air exit is a first air exit, and further comprising:

a second air inlet for drawing ambient air from outside of said cabinet, said second air inlet being coupled to a third connector, said third connector being connected to a first end of a third passageway and also being connected to a first end of a fourth passageway, a second end of said third passageway and a second end of said fourth passageway being connected to a fourth connector, to thereby create parallel airways between said third connector and said fourth connector, and a second air exit coupled to said fourth connector providing air to said fuel cell; and a second heater provided in said third passageway.

29. The cabinet according to claim 28, further comprising:

a third heater located within said second passageway; and a fourth heater located within said fourth passageway.

30. The cabinet according to claim 29, wherein said first, second, third and fourth heaters are electrically powered, resistive heaters, and further comprising:

a controller that automatically turns ON and OFF said first, second, third and fourth heaters to preheat the air supplied to said fuel cell to a predetermined level.

* * * * *